United States Patent
Azman et al.

(10) Patent No.: US 7,400,887 B2
(45) Date of Patent: Jul. 15, 2008

(54) METHOD FOR ESTIMATING THE DOWNLINK CAPACITY IN A SPREAD SPECTRUM WIRELESS COMMUNICATIONS SYSTEM

(75) Inventors: Utku Azman, Wayne, NJ (US); Monica Casado-Fernandez, Swindon (GB); Mark E Newbury, Hillsborough, NJ (US); Hong Yang, Ledgewood, NJ (US); Hai Zhou, Faringdon (GB)

(73) Assignee: Lucent Technologies Inc., Murray Hill, NJ (US)

( * ) Notice: Subject to any disclaimer, the term of this patent is extended or adjusted under 35 U.S.C. 154(b) by 189 days.

(21) Appl. No.: 11/121,432

(22) Filed: May 4, 2005

(65) Prior Publication Data

US 2006/0211427 A1  Sep. 21, 2006

Related U.S. Application Data

(60) Provisional application No. 60/662,835, filed on Mar. 17, 2005.

(51) Int. Cl.
*H04Q 7/20* (2006.01)
(52) U.S. Cl. .................. 455/446; 455/423; 455/424; 455/425; 455/450
(58) Field of Classification Search ......... 455/423–425, 455/446, 1, 67.11, 450; 370/252
See application file for complete search history.

(56) References Cited

U.S. PATENT DOCUMENTS

| | | | | |
|---|---|---|---|---|
| 5,095,500 A | * | 3/1992 | Tayloe et al. | 379/32.01 |
| 5,245,629 A | * | 9/1993 | Hall | 455/522 |
| 5,465,390 A | * | 11/1995 | Cohen | 455/446 |
| 5,561,841 A | * | 10/1996 | Markus | 455/446 |
| 5,596,570 A | * | 1/1997 | Soliman | 370/252 |
| 5,675,581 A | * | 10/1997 | Soliman | 370/252 |
| 6,052,584 A | * | 4/2000 | Harvey et al. | 455/423 |
| 6,094,580 A | * | 7/2000 | Yu et al. | 455/446 |
| 6,456,652 B1 | * | 9/2002 | Kim et al. | 375/224 |
| 2004/0203418 A1 | * | 10/2004 | Ang et al. | 455/67.11 |

* cited by examiner

*Primary Examiner*—Duc Nguyen
*Assistant Examiner*—David Wang

(57) ABSTRACT

The per sector or per cell downlink capacity in a spread spectrum wireless network is determined using a single test mobile that is operating within a background of simulated co-channel interference being broadcast in each sector by all cell sites in the network whose capacity is of interest. From all sectors, an Orthogonal Channel Noise Simulator (OCNS) generates a multiple number of calibrated test signals, which are aggregated and broadcast downlink, where each transmitted test signal simulates the downlink power transmitted to a live mobile. Each component test signal in the aggregated OCNS output transmitted in each sector is a sample of a stochastic process with a set mean and standard deviation that are determined from the mean and standard deviation of the power of a real signal transmitted downlink to the test mobile as it is moved around the network's coverage area. The capacity of the sector is determined by increasing the number of test signals in each aggregated OCNS output until measurable performance is compromised.

7 Claims, 4 Drawing Sheets

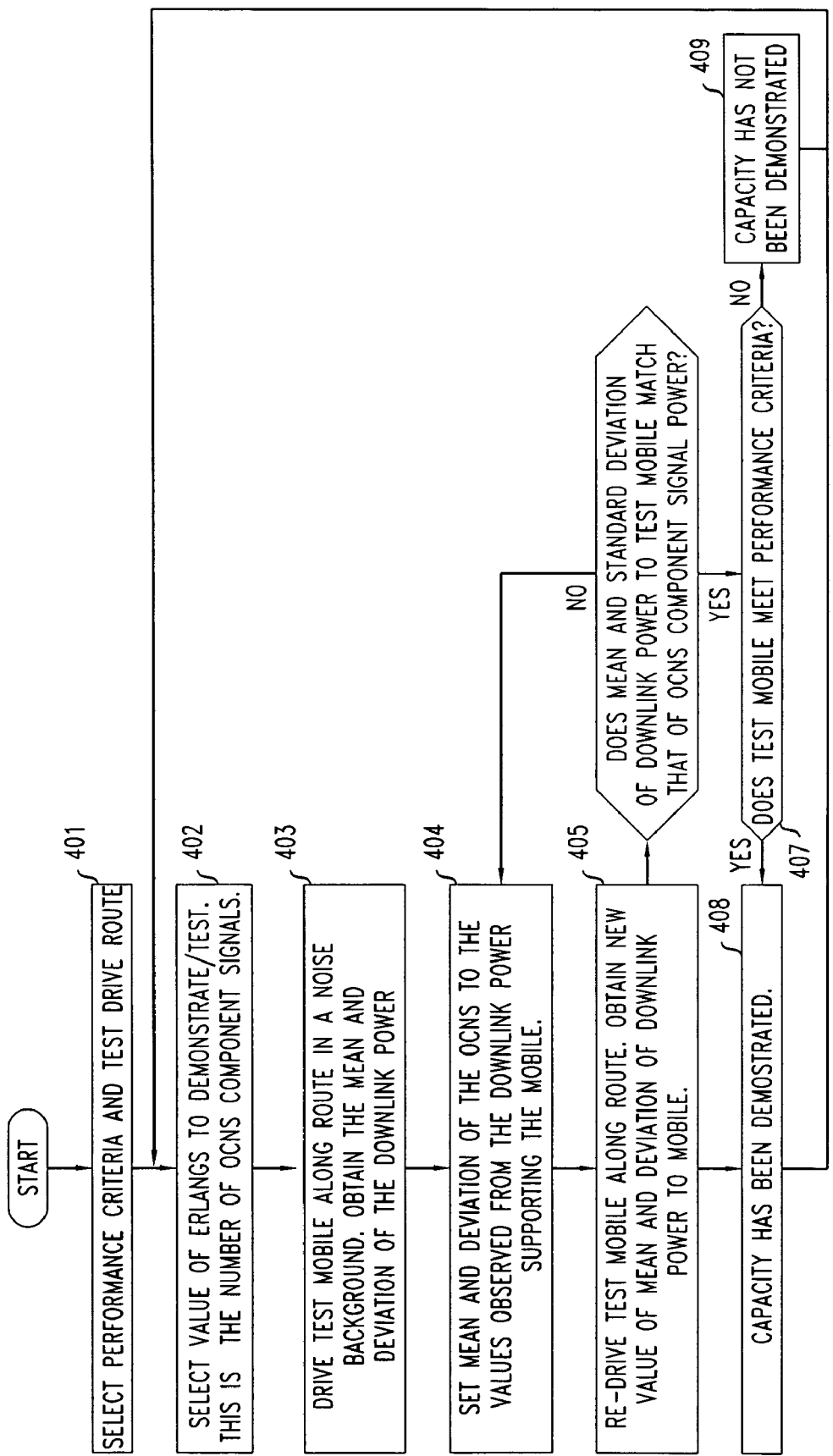

METHOD FOR ESTIMATING THE DOWNLINK CAPACITY IN A SPREAD SPECTRUM WIRELESS COMMUNICATIONS SYSTEM

CROSS-REFERENCE TO RELATED APPLICATIONS

This application claims benefit of U.S. provisional application Ser. No. 60/662,835, filed Mar. 17, 2005, which is herein incorporated by reference.

TECHNICAL FIELD

This invention relates to wireless communications and, more particularly, to determining the per sector or per cell downlink capacity between a base station and the transmitting/receiving mobile terminals in a spread spectrum wireless network.

BACKGROUND OF THE INVENTION

In a wireless communications system using spread spectrum techniques, such as those operating in accordance with various CDMA or UMTS standards, the same wideband radio carrier is reused within every cell; i.e., all transmissions share the same radio spectrum. Accordingly, all mobile terminals (referred to as "mobiles" hereinafter) that are simultaneously transmitting interfere with one another. This co-channel interference is managed and controlled through a variety of strategies. The universal use of the same radio carrier within CDMA/UMTS systems means that the achievable air interface capacity is dictated by the amount of background co-channel interference that can be tolerated without a compromise in performance (e.g., such as a reduced voice quality) and by limits on transmitter power (e.g., the downlink transmitter in the transmitter must have sufficient power to enable a receiving mobile to overcome the background interference).

The tolerable background co-channel-interference varies considerably from cell site-to-cell site and even from sector-to-sector in a service provider's coverage area, rendering predictions of air interface capacity difficult. Before a network is put into service by a service provider, a direct pre-commercialization evaluation of capacity of that network is of great interest to the service provider in order to confirm that the capacity of the network as designed is actually sufficiently large enough to handle expected traffic levels. Such an evaluation of a cell site's traffic handling capacity can be performed by flooding the network with live users and observing the responsive performance of a one or more test mobiles in the network's coverage area. Such a procedure is logistically difficult at best. Although such a methodology allows direct measurement of capacity (i.e., the system is loaded until observed performance is compromised), in practice it is often proves infeasible since it requires orchestration of a large number of field mobiles and associated test personnel.

Accordingly, a methodology is highly desirable that permits an estimate of downlink capacity to be determined in a simpler and more accurate manner.

SUMMARY OF THE INVENTION

In accordance with an embodiment of the present invention, the per sector or per cell downlink capacity in a spread spectrum wireless system is determined using a single test mobile that is operating within a background of simulated co-channel interference caused by the transmission of a multiple number of calibrated test signals being broadcast by all cell sites in the network whose capacity is of interest. More specifically, from all sectors, an Orthogonal Channel Noise Simulator (OCNS) generates a multiple number of calibrated test signals, which are aggregated and broadcast downlink, where each transmitted test signal simulates the downlink power transmitted to a live mobile. Each component test signal in the aggregated OCNS output transmitted in each sector is a sample of a stochastic process with a set mean and standard deviation that are determined from the mean and standard deviation of the power of a real signal transmitted downlink to the test mobile as it is moved around the network's coverage area. By so calibrating that multiple number of component test signals broadcast by each OCNS, the transmitted downlink signals are statistically equivalent to real signals broadcast by the sectors while supporting live traffic so that the transmission of these test signals emulates the downlink power that would be radiated to live mobiles. The behavior of a test mobile and each sector's downlink transmitter amplifier in a background of multiple number of component test signals that provide simulated co-channel interference is thus equivalent to the behavior that would be observed in the presence of co-channel interference caused by separate downlink transmissions to that same multiple number of real mobiles. That behavior, reflected in predetermined measurable performance characteristics, is used to determine whether the network can support real downlink traffic equal to at least that same multiple number of mobiles. The capacity of each sector can be determined by increasing the number of test signals generated by all the OCNSs until the measured performance characteristics indicate compromised performance.

BRIEF DESCRIPTION OF THE DRAWING

The exemplary embodiments of the present invention will become more fully understood from the detailed description given herein below and the accompanying drawings, wherein like elements are represented by like reference numerals, which are given by way of illustration only and thus are not limitative of the exemplary embodiments of the present invention.

FIG. 4 is a flowchart detailing a methodology for demonstrating a capacity in a coverage area in accordance with an embodiment of the present invention.

DETAILED DESCRIPTION

In an embodiment of the present invention, a method of estimating capacity in a spread spectrum wireless communications system is effected via a single test mobile operating within a background of calibrated, broadcast co-channel interference using an OCNS, which generates, at the base station for each sector, downlink power as if it were supporting multiple live mobile terminals. Specifically, the OCNS output consists of multiple separate downlink power transmissions where each transmission simulates the downlink power transmitted to a live mobile terminal. The principle behind this methodology is described below.

The OCNS within each base station in a service area of interest broadcasts co-channel interference on a sector-by-sector basis. Accordingly, the co-channel interference broadcast on a sector-by-sector basis is calibrated, i.e., it is adjusted so that the interference emulates that which is broadcast to a collection of live mobiles. Within each sector's OCNS, multiple individual traffic signals are combined and broadcast out of that sector's downlink transmitter amplifier. These transmissions mimic the downlink power that would be radiated to live mobiles. Each signal is a sample of a stochastic process with a preset mean and standard deviation. The power transmitted by each OCNS through its sector downlink transmitter amplifier consists of these individual traffic signals that are summed and broadcast out of the amplifier as if it were supporting real traffic.

Although the general concept of broadcasting background co-channel interference to load the system is not new, broadcasting multiple signals that are calibrated so as to be statistically equivalent to the live signals in order to accurately estimate capacity limits within a spread spectrum wireless system is a novel concept. This method of estimating capacity is based on the following:

(1) A single test mobile within the network is unable to tell the difference between exposure to the co-channel interference broadcast by the network while supporting live traffic, and exposure to the simulated co-channel interference broadcast by the OCNSs from all sectors, provided that each OCNS is properly calibrated to output signals that are statistically equivalent to the signals generated by the live traffic;

(2) Each downlink transmitter amplifier is unable to tell the difference between broadcasting a collection of signals to live mobiles and broadcasting a collection of component OCNS signals, provided that each OCNS is properly calibrated; and (3) As a result of (1) and (2), the behavior of the test mobile and of each downlink amplifier is equivalent to that which would be observed during a live capacity test (i.e., a test where the network is flooded with live mobiles in order to directly determine capacity). This equivalence allows estimation of capacity.

Figure 1:
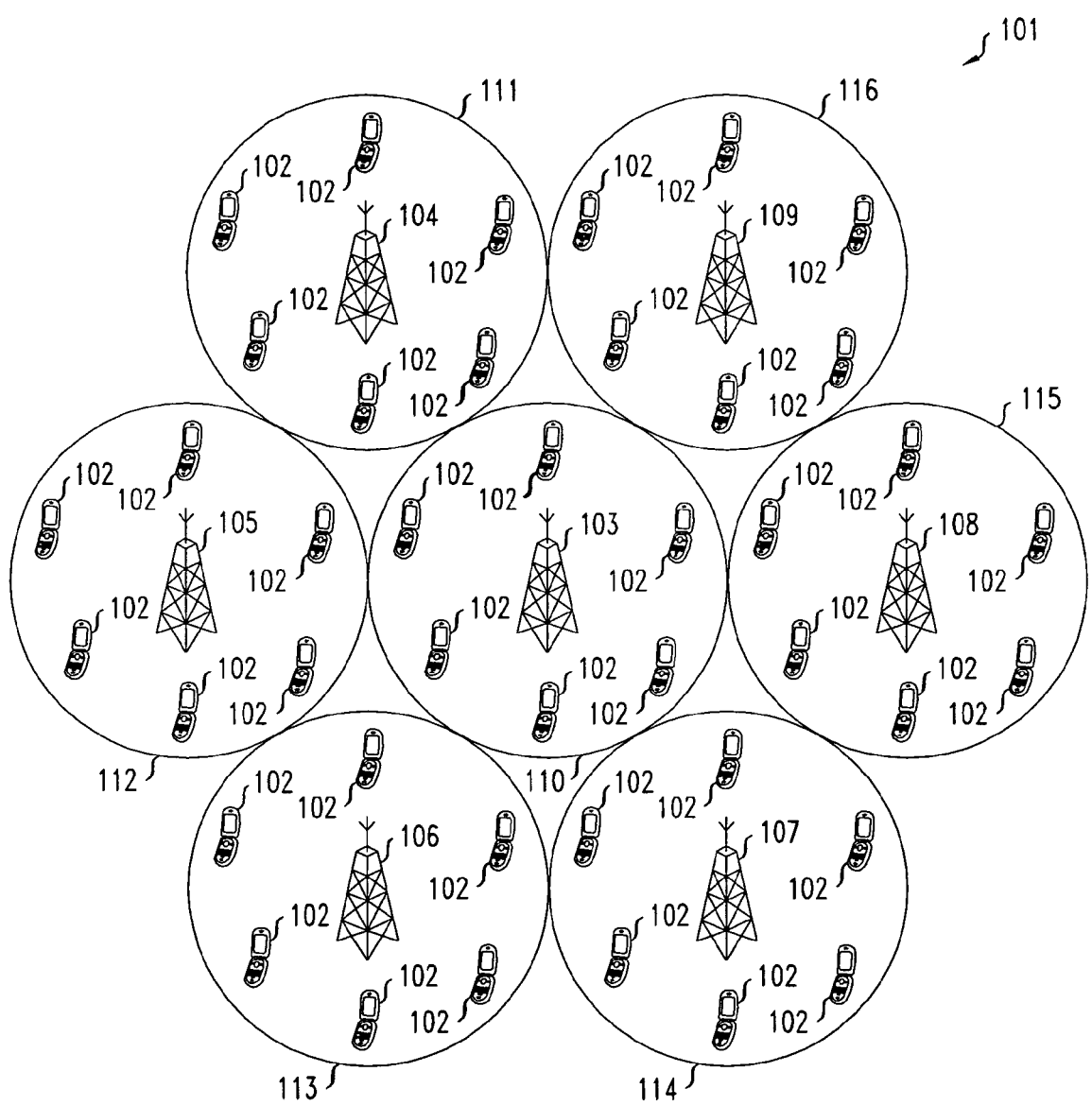
FIG. 1 shows a prior art methodology for a direct evaluation of downlink capacity by flooding a network with multiple live mobiles.

With reference to FIG. 1, a wireless system 101 is shown in which a prior art direct evaluation of downlink capacity is executed by flooding the network with a plurality of live mobiles 102. The illustrative network 101 is shown with base stations 103-109, having coverage areas 110-116, respectively. At any point within any of these coverage areas, the co-channel interference experienced by any particular mobile 102 is affected by the downlink transmissions to all other mobiles from all cell sites in all the coverage areas. In performing a direct evaluation of downlink capacity where the system is flooded with live mobiles 102, the observed behavior of each downlink transmitter amplifier (not shown) within the overall network coverage area and of a single test mobile 117 is used to determine capacity limits. Use of the latter as a representation of all live mobiles is possible since the behavior of all mobiles is not identical, but is statistically equivalent. The capacity limit is determined by the maximum number of live mobiles that can be supported before performance compromise occurs. This occurs, for example, when any sector downlink transmitter amplifier runs out of power (i.e., when any sector downlink transmitter amplifier declares an overload for an undesirable fraction of time [e.g., greater than 2% of the time]); and/or when the performance of the test mobile degrades (e.g., the voice quality as dictated by the channel error rate falls below a pre-defined threshold).

Figure 2:
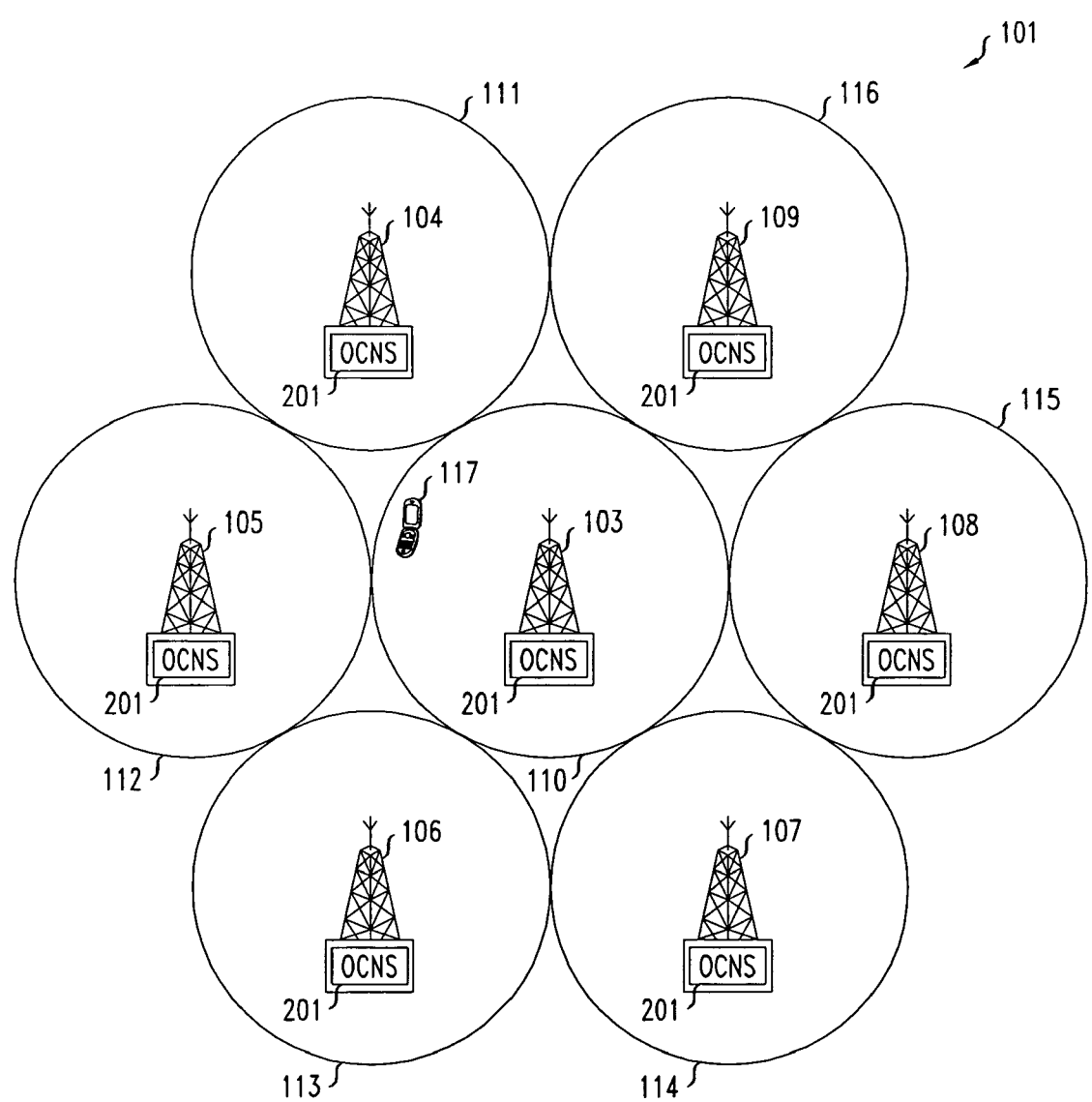
FIG. 2 illustrates a methodology in accordance with an embodiment of the present invention where the multiple live mobiles are replaced by the transmission of multiple calibrated test signals that mimic the downlink power that would be radiated to live mobiles.

FIG. 2 illustrates the system of FIG. 1, in accordance with an embodiment of the invention, where the live mobiles 102 have been removed. All cell site downlink transmissions remain, however, through the broadcast of multiple signals by an OCNS 201 in each base station 103-109, where the multiple signals are calibrated to be statistically equivalent to the signals transmitted to the live mobiles. By properly calibrating each OCNS 201, the behavior of each downlink sector amplifier in each base station 103-109 within coverage areas 110-116, respectively, and of the test mobile 117 while operating in an OCNS background is statistically identical to that which would be observed during operation within a background of live mobiles, as in FIG. 1. Accordingly, as the number of OCNS component signals is increased (i.e., as more and more simulated downlink component signals are added to the composite OCNS output signal), each downlink transmitter amplifier and the test mobile performance are similarly compromised. The capacity is directly and accurately estimated by the maximum number of per sector calibrated OCNS component signals that can be supported before performance compromise occurs.

The method of capacity estimation entails the following steps:

(1) Calibrating each OCNS 201 (either individually, or based on the calibration of a single OCNS) so that the broadcast downlinks are statistically equivalent to the live broadcast signals; i.e., statistically equivalent to the signals broadcast by the sector while supporting live traffic.

(2) Broadcasting the appropriate number of OCNS signals by each OCNS 201. This value is equal to the number of per sector Erlangs (traffic load, or average channel usage) desired to load the system.

(3) Driving the test mobile 117 along a test drive route within the network's coverage areas 110-116, and observing the performance of the test mobile (e.g., voice quality) and the performance of each downlink amplifier (e.g., overload) within the network.

(4) Checking performance, and repeating steps 1-3 if necessary. For example, if the performances of the test mobile and all the cell downlink amplifiers are determined to be acceptable, then a capacity equal to at least the number of OCNS component signals that are being transmitted in each sector has been demonstrated. Steps 1 through 3 can then be repeated with a higher value of Erlangs per sector (an additional number of OCNS signals) to discover the actual capacity limit. If the performances of the test mobile and the amplifiers are determined to not be acceptable, then the loaded capacity has not been demonstrated. Steps 1 through 3 can then be repeated with a lower value of Erlangs per sector (a fewer number OCNS component signals) in order to determine the actual capacity limit.

This above-described methodology depends upon an accurate calibration of the OCNS downlink component signals. In order to properly calibrate the OCNS downlink signals (i.e., to broadcast a co-channel interference background that is statistically equivalent to that broadcast in support of a collection of live mobiles), what is exploited is the fact that the procedure is designed to estimate maximum or near-maximum capacity limits of wireless systems with high spectral efficiency, i.e., wireless systems that are designed to support large numbers of simultaneous users. (It should be noted that the interference broadcast comprises a large number of [nearly] independent links; accordingly, a variant of the Central Limit Theorem applies). Accordingly, the distribution of the total broadcast interference can be adequately characterized by a mean and variance The broadcast of an interference distribution with appropriate mean and variance is therefore sufficient to ensure that the behavior of the test mobile and of each sector downlink transmitter amplifier are equivalent to that observed when the network is supporting a collection of live users.

Each OCNS 201 generates and sums individual component signals on a per-sector basis. Each component signal is a waveform taken from a random (stochastic) process with parameters set to emulate the random process that characterizes live downlink transmissions. Each component signal is a random walk with additional imposed variations such as voice activity and fading.

Figure 3:
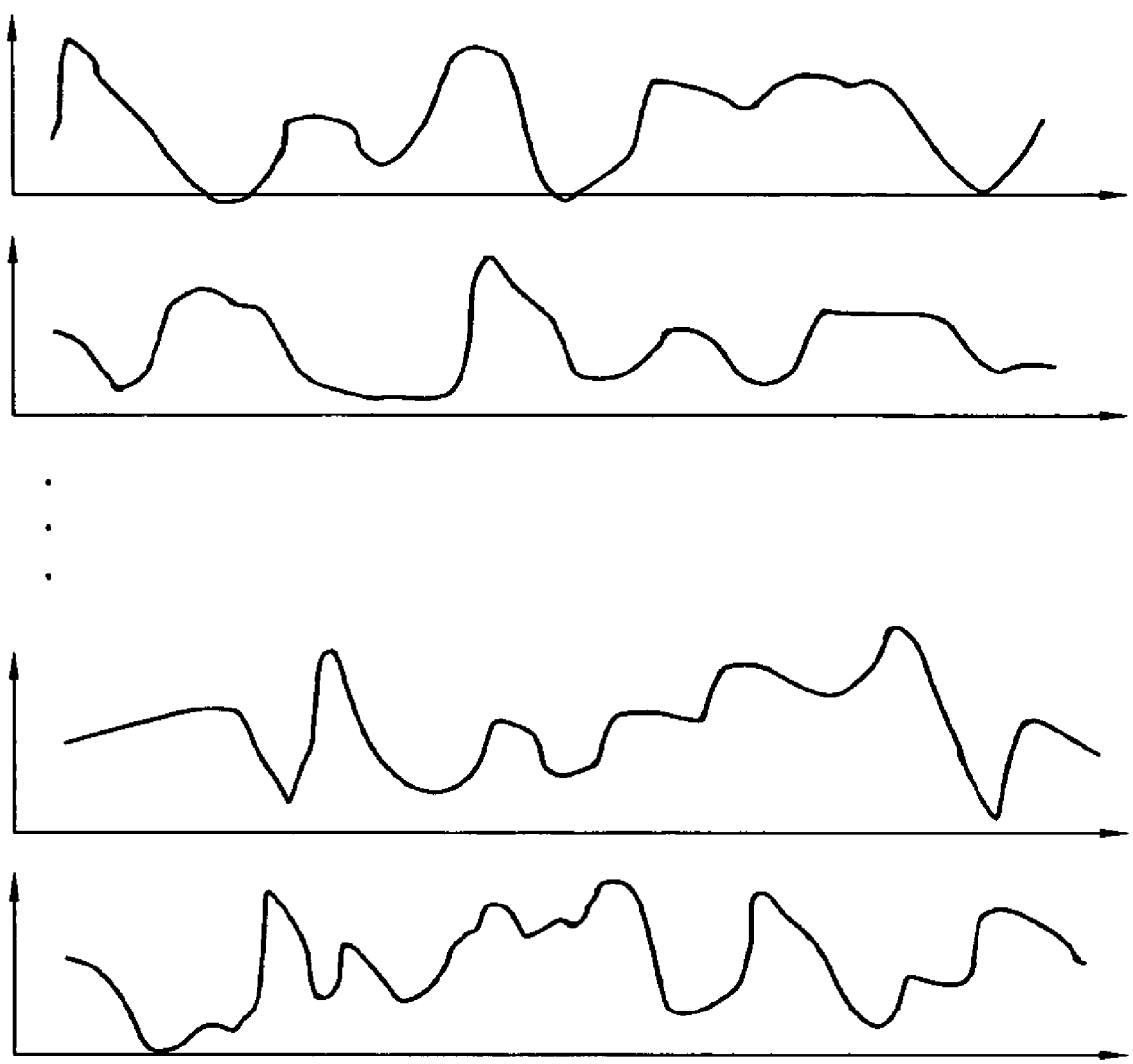
FIG. 3 shows a collection of waveforms that represent a sector's downlink transmissions to live mobiles within its coverage area.

FIG. 3 shows a collection of waveforms that represent a sector's downlink transmission to live mobiles within its coverage area. In the estimation of capacity via the use of single test mobile in a background of co-channel interference, the live downlink transmissions from each cell site are replaced by the broadcast of multiple OCNS-generated signals. Each OCNS broadcast is calibrated if its mean and variance remain comparable to that of the live broadcast. In the method, calibration is executed by adjusting parameters of the signals outputted by each OCNS 201 so that the OCNS component signals and the live signal being transmitted by each base station to the test mobile 117 can all be viewed as samples from the same stochastic process.

Specific adjustments of OCNS are made using an iterative test drive process in the field. This iterative process is required since the downlink power supplied to the test mobile is used for calibration, but the downlink power supplied to the test mobile is itself a function of the level of background interference. Specifically, the process proceeds as follows:

(1) A record of downlink transmitter power transmitted by each base station to the test mobile (i.e., a record of a live signal to the test mobile) along the test drive route is obtained via simulation, or via a test drive in a natural noise background in the absence of any OCNS-transmitted interference signals. This is measured at each base station and fed to a common central location, such as the Mobile Switching Center (MSC).

(2) The OCNS parameters for each base station are then adjusted so that the mean and variance of the OCNS interference background are consistent with the statistical properties of the downlink signal transmitted by each base station to the live test mobile. Specifically, each component signal is adjusted so that the total radiated power of each OCNS (the sum of the component signals) has a mean and variance consistent with the total downlink transmission to the number of mobile terminals associated with the capacity being demonstrated.

(3) The test drive is then re-executed within the OCNS-transmitted interference background.

(4) The statistical properties of the new live downlink transmissions to the test mobile are then compared to those of the OCNS background.

(5) If the statistical properties are comparable, then the capacity of the system to handle traffic equivalent to the number of per sector OCNS component signals has been demonstrated if performance criteria have been met. If the statistical properties are not comparable, then the second through fifth steps are repeated until the two are comparable and performance criteria are met.

For illustrative purposes a specific example is described in association with FIG. 4. At step 401, a representative test drive route is selected within the coverage area of the network being investigated. (The route could take up to several hours to drive). Also, the performance criteria on which to base whether a selected capacity can be supported is determined. The selected capacity should be supported at a "good" value of voice quality. For example, when supporting that amount of traffic, the average downlink voice channel error rate should not exceed a predetermined rate, such as, 2%. Further, that amount of traffic should be supported at a negligible level of blocking. For example, when supporting that amount of traffic, each sector downlink transmitter amplifier should not declare overload for more than 2% of the time. If these are the chosen performance criteria, then for whatever capacity is being demonstrated, both performance criterion need to be satisfied. For example, if the amount of traffic selected to be demonstrated is 40 Erlangs/sector but an average voice channel error rate of 10% is demonstrated, then the 40 Erlangs load has not been demonstrated. It should be noted that the performance criteria quoted is for example only. A service provider may desire to demonstrate 40 Erlangs, for example, at an average voice channel error rate of 3%, if this level of voice quality has been decided to be deemed acceptable. At step 402, the value of per sector Erlangs to be demonstrated/tested is selected. This is the number of per sector OCNS component signals that will be transmitted by each OCNS 201 in the network.

At step 403, the test mobile is driven along the test drive route in a background of natural noise (i.e., no other mobiles are on the system; the OCNS in each base station is turned off so the cell sites are not radiating any traffic signals save for the signal needed to support the test mobile). The power of each downlink transmitter amplifier supplied to the test mobile over time (i.e., over the test route) is recorded at the transmitter amplifier in the base station and the average and standard deviation of this power are computed. For example, the average may be 200 milliwatts with a standard deviation of 300 milliwatts.

At step 404, the OCNS within each base station in the network's coverage area is set to generate 40 OCNS component signals per sector (corresponding to a traffic of 40 Erlangs per sector). As noted above, it is desired that the aggregate radiated OCNS signal output from each base station in each sector (the sum of the component signals) have a mean of 40×0.2 or 8 watts and a standard deviation of $\sqrt{(40 \times 0.3)}$ or 1.9 watts. (Based on data obtained from step 403, these values are consistent with the aggregate signal that would be broadcast to support 40 live mobiles per sector). This objective is accomplished by adjusting the OCNS parameters of each OCNS so that each component signal has approximately the same mean (200 milliwatts) and the same standard deviation (300 milliwatts) as the test mobile. Random variations per component signal will prevent the mean and standard deviation of each component signal from being exactly 200 milliwatts and 300 milliwatts, respectively. The aggregate or sum of the individual component signals, however, smoothes out the random variations, yielding the correct mean and variance of the aggregated OCNS signals transmitted in each sector by each base station.

At step 405, the test route is re-driven within this background of co-channel interference being transmitted downlink; i.e., with the 40 component signals being transmitted by each OCNS. The average and standard deviation of the downlink power supplied to the test mobile are re-computed as the test mobile is driven around the network's coverage area. The average transmitted power may now be 250 milliwatts instead of the previous 200 milliwatts, for example, and the standard deviation may be 400 milliwatts instead of the previous 300 milliwatts. This is not an unexpected result. The average and standard deviation of each site's downlink power that needs to be transmitted to the test mobile is now greater because the background of co-channel interference impairs the mobile receiver's performance, and each transmitter amplifier at the base stations along the test route therefore needs to transmit additional power to the test mobile in order to overcome the co-channel interference.

At step 406, the measured mean (e.g., 250 milliwatts) and standard deviation (e.g., 400 milliwatts) of the downlink power transmitted to the test mobile are compared with the mean transmitted OCNS component signal power (e.g., 200 milliwatts) and standard deviation (e.g., 300 milliwatts). If the values do not match, each OCNS transmitted power is readjusted at step 404 to match the values transmitted to the test mobile and observed at the base station. Thus, for this example, the OCNS parameters are adjusted so that each component signal has a mean of 250 milliwatts and a standard deviation of 400 milliwatts.

Step 405 is repeated, so that the test route is re-driven within this updated background of co-channel interference. The average and standard deviation of the base station's downlink power transmitted to the test mobile are then re-computed. These values are likely to change again because the level of background co-channel interference has now changed again. If, for example, this average is now 255 milliwatts, and the standard deviation is 405 milliwatts, then, at step 406, these values can be considered to be close enough to the OCNS transmitted values of 250 milliwatts and 400 milliwatts to declare a match. If the values are still not close, additional iterations of steps 404-406 are performed until an acceptable match is achieved.

After a match is declared, at step 407, the performance of the test mobile and all cell site transmitter amplifiers are checked to ensure that the performance criteria are met (e.g., predetermined voice quality and/or amplifier overload). If they are met, then, at step 408, the capacity of the system to handle 40 Erlangs per sector has been demonstrated. If the performance critera are not met, then, at step 409, the capacity is less than 40 Erlangs per sector.

In either case, further steps can be taken to assess the actual maximum capacity of the network. Thus, if, at step 407, the performance criteria are met, then the capacity might be greater than 40 Erlangs per sector if the performance criteria have been met with ease (e.g., measured voice quality is well within the performance criteria). On the other hand, if, at step 407, the performance criteria are not met, then the capacity is less than 40 Erlangs per sector (e.g., the measured voice quality violates predetermined performance limits, or the percentage of time that any downlink amplifier is in overload for greater than a predetermined interval of time; either being indicative that the actual capacity is lower than 40 Erlangs per sector). Thus, step 402 is returned to after either steps 408 or 409, and a new higher or lower value of Erlangs is chosen to be demonstrated. If, for example, a capacity of 40 Erlangs per sector was demonstrated, a progressively greater number of OCNS component signals are selected at step 402, and steps 403-407 are repeated until the test mobile and all base station transmitter amplifiers demonstrate a performance that is at the limit of the predetermined performance criteria. If, on the other hand, 40 Erlangs per sector of traffic could not be demonstrated, then that number of OCNS component signals is reduced at step 402 and steps 403-407 are repeated using the reduced number in order to determine whether that reduced capacity can be demonstrated.

Although described above in connection with determining capacity of a spread spectrum wireless network operating in accordance with CDMA/UMTS wireless standards, the present invention could be employed to determine capacity in any wireless network using other technologies, but where mobiles are actively competing for shared resources.

While the particular invention has been described with reference to illustrative exemplary embodiment, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Those skilled in the art will thus readily recognize that such various other modifications, arrangements and methods can be made to the present invention without strictly following the exemplary applications illustrated and described herein and without departing from the spirit and scope of the present invention. It is therefore contemplated that the appended claims will cover any such modifications or embodiments as fall within the true scope of the invention.

The invention claimed is:

1. A method of determining capacity in a wireless network in which plural signals are transmitted on a shared downlink channel to plural mobiles within a coverage area of the network, the method comprising:
   a) transmitting, from a first base station, a real signal on the downlink channel to a test mobile as it is moved on a test route within the network's coverage area;
   b) determining a mean and a variance of the real signal as it is being transmitted on the downlink channel while the test mobile moves on the test route;
   c) transmitting, from the first base station, an aggregate of a plurality of first test signals on the downlink channel, each of the plurality of first test signals corresponding to simulated transmission from the first base station to each of a first plurality of mobiles, each first test signal being a sample of a stochastic process that is calibrated to the determined mean and the determined variance of the real signal so that the plurality of first test signals is statistically equivalent to signals transmitted to live mobiles;
   d) transmitting, from at least one second base station, an aggregate of a plurality of second test signals on the downlink channel, each of the plurality of second test signals corresponding to simulated transmission from the second base station to each of a second plurality of mobiles, each second test signal being a sample of a stochastic process that is calibrated to the determined mean and the determined variance of the real signal so that the plurality of first test signals is statistically equivalent to signals transmitted to live mobiles;
   e) determining whether or not an acceptable performance is indicated by at least one predetermined measurable performance characteristic when the real signal and the first and second pluralities of test signals are being transmitted as the test mobile is being moved on the test route; and
   f) if acceptable performance is determined, determining that the downlink channel has the capacity of handling downlink traffic corresponding to at least the first and second pluralities of mobiles.

2. The method of claim 1 wherein if acceptable performance is determined, increasing the first and second pluralities to third and fourth pluralities, respectively, the third and fourth pluralities being a greater number than the first and second pluralities, respectively, and repeating a) through e) to determine whether the acceptable performance is indicated with the third and fourth pluralities, and if acceptable performance is indicated with the third and fourth pluralities, determining that the downlink channel has the capacity of handling downlink traffic to at least this third and fourth pluralities of mobiles.

3. The method of claim 2 wherein if acceptable performance is determined at the third and fourth pluralities, increasing the third and fourth pluralities to successively greater numbers and repeating a) through e) to determine whether acceptable performance is determined for reach successively greater number until a plurality is reached at which unacceptable performance is determined.

4. The method of claim 1 wherein if acceptable performance is not determined, decreasing the first the first and second pluralities to third and fourth pluralities, respectively, the third and fourth pluralities being a smaller number than the and second pluralities, respectively, and repeating a) through e) to determine whether the acceptable performance is indicated with the third and fourth pluralities, and if acceptable performance is determined, determining that the downlink channel has the capacity of handling downlink traffic to at least this third and fourth pluralities of mobiles.

5. The method of claim 4 wherein if acceptable performance is not determined at the third and fourth pluralities, decreasing the third and fourth pluralities to successively smaller numbers and repeating a) through e) to determine whether acceptable performance is determined for each successively smaller greater number until a plurality is reached at which acceptable performance is determined.

6. The method of claim 1 wherein the at least one predetermined performance criteria is at least one of an average downlink error rate being greater than a predetermined error rate; and a percentage of time that a downlink amplifier is in an overload state being greater than a predetermined percent.

7. The method of claim 1, wherein each first test signal is a sample of a stochastic process that is calibrated to the determined mean and the determined variance of the real signal so that a downlink amplifier is unable to determine a difference between broadcasting a plurality of signals to live mobiles and transmitting the aggregate of the plurality of first test signals on the downlink channel.

* * * * *